Feb. 20, 1934.   P. M. BOURDON   1,948,060
VEHICLE WHEEL AND TIRE
Filed Jan. 28, 1932   2 Sheets-Sheet 1
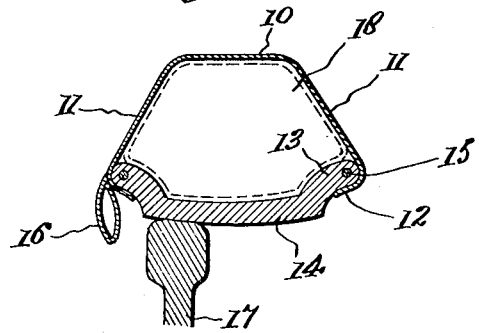
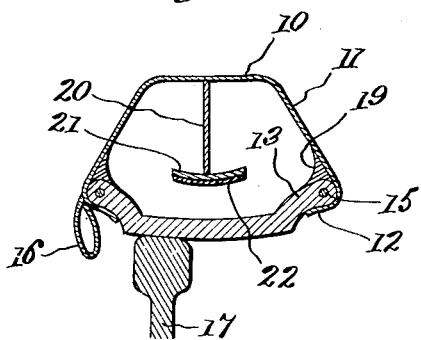
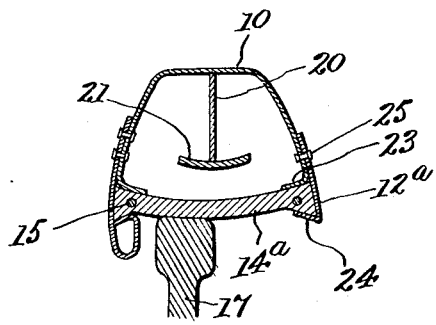
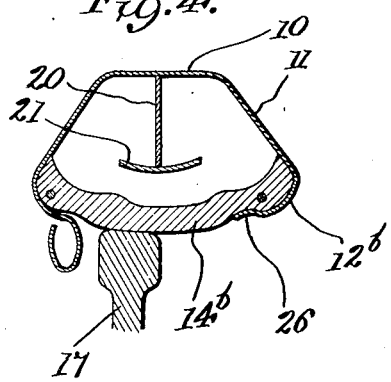
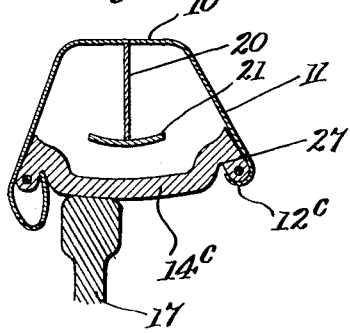
Inventor
*Pierre Marcel Bourdon*
By *Wilkinson & Mawhinney*
Attorneys Feb. 20, 1934. P. M. BOURDON 1,948,060
VEHICLE WHEEL AND TIRE
Filed Jan. 28, 1932 2 Sheets-Sheet 2
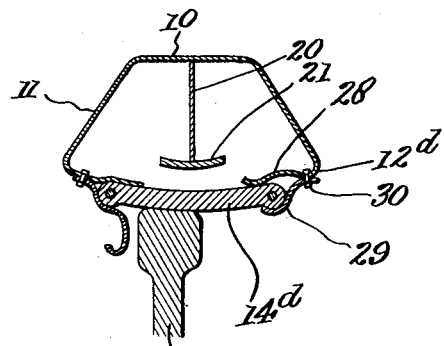
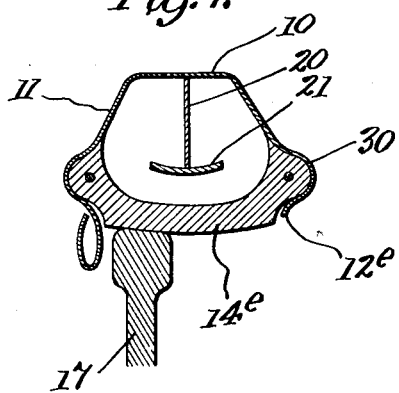
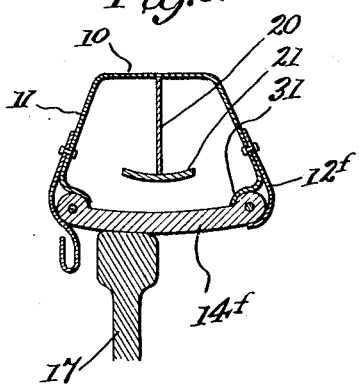
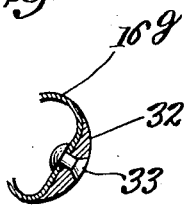
Inventor
Pierre Marcel Bourdon
By Wilkinson & Mawhinney
Attorneys.

Patented Feb. 20, 1934

1,948,060

UNITED STATES PATENT OFFICE 1,948,060

VEHICLE WHEEL AND TIRE

Pierre Marcel Bourdon, Paris, France, assignor to Michelin Et Cie, Clermont-Ferrand, France, a corporation of France Application January 28, 1932, Serial No. 589,481, and in France March 5, 1931

4 Claims. (Cl. 295—31)

The present invention relates to improvements in vehicle wheels and tires, and relates more particularly to a construction of wheels and pneumatic tires for vehicles traveling on rails.

In accordance with the invention the lateral parts, or side walls of the pneumatic tires are virtually abolished, being replaced by extended side walls of the felly or rim which carries the tire.

The felly thus possesses a substantially hollow form and is so disposed as to contain an inner tube or volume of air which expands against the pneumatic tire forcing the same outwardly of the tubular rim. The tire is thus reduced in form to substantially that of a simple band held to the rim by appropriate means.

It is another object of the invention to construct a combined tire and rim so that the rim will receive the inner tube or, dispensing with the inner tube, will receive directly a volume of air to inflate the tire.

The invention also contemplates the provision in the hollow rim of an emergency or safety device adapted to prevent the excessive inward movement or crushing of the pneumatic tire in case of deflation.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section taken through a rail, tire and rim constructed according to the present invention.

Figures 2 to 8 are similar views showing various modifications, and

Figure 9 is also a vertical section showing a modified form of guide flange.

Referring more particularly to Figure 1, 10 designates the base of a rim or felly which is constructed of a trough-like shape having the deep, preferably flaring side walls 11 terminating at their outer ends in flanges 12 which are adapted to receive the beads 13 of a pneumatic tire 14. The beads of the tire may contain the wires or rods 15. A guide flange 16 is shown as extending outwardly from the rim or rather from one side wall 11 of the rim in order to cooperate with the rail 17 in maintaining the wheel on such rail. In the trough of the rim may be an inner tube 18 or an air chamber which will maintain the tire or casing 14 inflated to the proper pressure. An inner tube may be employed or the space within the rim may simply form an air chamber into which air is introduced in accordance with the usual method.

Figure 2 shows a similar form with the same parts represented by the same reference numerals. In this case, however, the inner tube is dispensed with and air may be introduced into the space within the rim, the necessary tightness being secured by strips or inserts of rubber or other material 19 between the side walls of the rim and the beads of the casing 14.

Preferably these strips 19 are substantially triangular in cross section and have inner concave faces to take the air pressure and insure that the sides of the strips are wedged in against the rim and the tire.

In Figure 2 there is also shown a safety device consisting of an annular member 20 of sheet metal or other desired material carried by the rim 10 and extending outwardly as in the central position to an appropriate point within the walls 11 and spaced from the shoe or casing 14 when in the inflated condition shown. The member 20 carries upon its free edge a cross piece 21 which is preferably of an outer convex form to present a smooth surface to the casing 14 when the latter is deflated; this member or piece 21 being so situated that it will receive the casing 14 upon undue deflation of the tire. This will prevent injury and deterioration of the casing 14 or deflation due to puncture or the like and will permit running on the tire until such time as the same may be changed or repaired.

The outer convex surface of the piece 21 may be provided with a covering 22 of rubber or like protective material if desired in order to form a rubber to rubber contact when the casing comes against the piece 21.

In Figure 3 a further modification is shown in which the flanges 12ª are removable, which construction facilitates the mounting and demounting of the tires. The outer walls of the rim in this case are provided with inturned shoulders 23 for receiving thereagainst the beads of the tire 14ª, such beads having wedge-like form if desired. The flanges 12ª are provided with overhanging edges 24 opposed to the shoulders 23 for grasping therebetween the dove-tail or wedge-like beads of the casing 14ª. The flanges 12ª may be overlapped with the side walls of the rim and secured thereto as by bolts 25 or other appropriate fastenings.

In Figure 4 a modified form of flange 12ᵇ is shown having extended incurved parts 26 to grip corresponding concave parts of the casing 14ᵇ in order to secure a better grip on the casing.

In Figure 5 the flanges 12ᶜ of the rim are bent about in substantially a semi-circle and enter grooves 27 of the casing 14ᶜ. This also secures a tight grip on the tire.

Referring more particularly to Figure 6, the flanges 12ᵈ in this case are also of peculiar form consisting of the reversely curved shoulders 28 of the rim which extend approximately horizontally toward one another and receive the inner portions of the beads of the casing 14ᵈ while removable trough-shaped flanges 29 extend over the outer portions of the tire beads and are secured to the rim or to the members 28 as by rivets or other appropriate fastenings 30.

Referring more particularly to Figure 7 the side walls of the rim are provided with outwardly bulged or rounded portions 30 forming internal grooves to receive the correspondingly formed beads of the casing 14ᵉ. The flanges 12ᵉ on the outer parts of the rim are bent inwardly in order to firmly grip the beads of the tire.

Referring more particularly to Figure 8 removable flanges 12ᶠ are also shown overlapped with the rim and secured thereto in any appropriate manner and having outwardly curved portions for engaging the outside of the beads of the shoe 14ᶠ while the inner shouldered portions 31 of the rim are rounded to receive the rounded portions of the inner parts of the beads.

Referring to Figure 9, this figure shows a modified form of guide flange 16ᵍ carrying a removable wear plate or piece 32 secured thereto as by a rivet or other fastening 33. This wear piece or plate 32 will engage the rail 17 and it may be renewed whenever worn from long service.

It is to be understood that the invention is not limited to the details of construction above referred to, but I reserve the right to make such changes and modifications as are within the spirit of the invention provided the same are contemplated within the purview of the following claims.

What is claimed is:—

1. A vehicle wheel and tire comprising a rim having deep side walls, flanges on the side walls, a substantially flat flexible casing having beads at its sides for removably being received within said flanges, and strips between the side walls of the rim and said beads, said strips being substantially triangular in cross section and having inner concave parts exposed to the air pressure.

2. A vehicle wheel and tire comprising a rim having deep side walls, flanges in the side walls, a substantially flat flexible casing having beads at its sides for removably being received within said flanges, and strips between the side walls of the rim and said beads.

3. A vehicle wheel and tire comprising a substantially deep walled rim having removable flanges at its outer edges, shoulders on the rim sides spaced from said flanges, a rail flange carried by one of the rim flanges, and a casing member having beads fitted between said flanges and shoulders.

4. A vehicle wheel and tire comprising a generally V-shaped rim composed of a flat inner portion, outwardly extending and outwardly inclined side walls, and flanges extending inwardly from the outer portions of the side walls, and a substantially flat casing member extending across the outer wider portion of said rim and having beads extending inwardly of the flanges, said flanges engaging the outer surfaces of said beads, said side walls having portions disposed at an angle to the line of inward movement of said casing member and engaging the inner surfaces of said beads, said flanges and said portions of said side walls constituting sockets for the reception and retention of said beads whereby the casing member is held against undue bulging and collapsing.

PIERRE MARCEL BOURDON.